United States Patent
Hanes

(10) Patent No.: US 11,477,297 B2
(45) Date of Patent: Oct. 18, 2022

(54) HEADLESS DEVICE INSTALLATIONS

(71) Applicant: Hewlett-Packard Development Company, L.P., Spring, TX (US)

(72) Inventor: David H. Hanes, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 11 days.

(21) Appl. No.: 16/648,809

(22) PCT Filed: Oct. 9, 2017

(86) PCT No.: PCT/US2017/055781
§ 371 (c)(1),
(2) Date: Mar. 19, 2020

(87) PCT Pub. No.: WO2019/074481
PCT Pub. Date: Apr. 18, 2019

(65) Prior Publication Data
US 2020/0274933 A1    Aug. 27, 2020

(51) Int. Cl.
*H04L 67/00* (2022.01)
*H04L 12/28* (2006.01)
(Continued)

(52) U.S. Cl.
CPC .......... *H04L 67/34* (2013.01); *H04L 12/2807* (2013.01); *H04L 41/0806* (2013.01); *H04L 67/125* (2013.01); *H04L 67/51* (2022.05)

(58) Field of Classification Search
None
See application file for complete search history.

(56) References Cited

U.S. PATENT DOCUMENTS 7,120,679 B2   10/2006  Remer
9,418,658 B1    8/2016  David et al.
(Continued)

FOREIGN PATENT DOCUMENTS

CN      106376098 A  *  2/2017
EP        3352527 A1 *  7/2018   ............ H04W 16/24

OTHER PUBLICATIONS

Gebhart, A., How to Bring Alexa Into Every Room of Your Home, Jan. 31, 2017, https://www.cnet.com/how-to/how-to-install-alexa-in-every-room-of-your-home/.

*Primary Examiner* — Lance Leonard Barry
(74) *Attorney, Agent, or Firm* — Fabian VanCott

(57) ABSTRACT

A method of installing a plurality of headless devices includes: scanning for the plurality of headless devices that are to be initially installed and are not yet connected to any network; detecting a first headless device of the plurality of headless devices; communicatively coupling the first headless device to a network; and storing network data relating to the coupling of the first headless device to the network in a storage device. The method further includes scanning for a subsequent headless device of the plurality of headless devices; and determining if the subsequent headless device is to be communicatively coupled to the network using the stored network data. In response to a determination that the subsequent headless device is to be communicatively coupled to the network, the method includes using the stored network data, communicatively coupling the subsequent headless device to the network using the stored network data without user input of the network data; and then deleting the network data relating to the coupling of the first headless device to the network from the storage device when a last headless device has been connected to the network.

6 Claims, 5 Drawing Sheets

(51) Int. Cl.
   *H04L 67/125*     (2022.01)
   *H04L 41/0806*    (2022.01)
   *H04L 67/51*      (2022.01)

(56) References Cited

U.S. PATENT DOCUMENTS

| | | | |
|---|---|---|---|
| 10,361,878 B1* | 7/2019 | Loreille | H04L 12/2827 |
| 2005/0193080 A1* | 9/2005 | Gold | H04L 41/082 |
| | | | 709/208 |
| 2007/0147261 A1* | 6/2007 | Schumacher | H04L 41/12 |
| | | | 370/248 |
| 2008/0189398 A1* | 8/2008 | Solyanik | H04L 67/34 |
| | | | 709/221 |
| 2015/0071216 A1 | 3/2015 | Ilsar et al. | |
| 2015/0186156 A1 | 7/2015 | Brown et al. | |
| 2015/0324181 A1* | 11/2015 | Segal | H04W 52/0264 |
| | | | 717/178 |
| 2015/0382198 A1* | 12/2015 | Kashef | H04W 4/50 |
| | | | 726/5 |
| 2016/0088026 A1* | 3/2016 | Mohamad Abdul | G06F 8/61 |
| | | | 726/1 |
| 2016/0142911 A1* | 5/2016 | Kreiner | H04W 48/18 |
| | | | 370/328 |
| 2016/0242137 A1* | 8/2016 | Benoit | H04L 12/2809 |
| 2016/0335138 A1 | 11/2016 | Surti et al. | |
| 2016/0366538 A1* | 12/2016 | Agarwal | H04W 4/80 |
| 2017/0063608 A1* | 3/2017 | Wang | G06F 16/258 |

\* cited by examiner

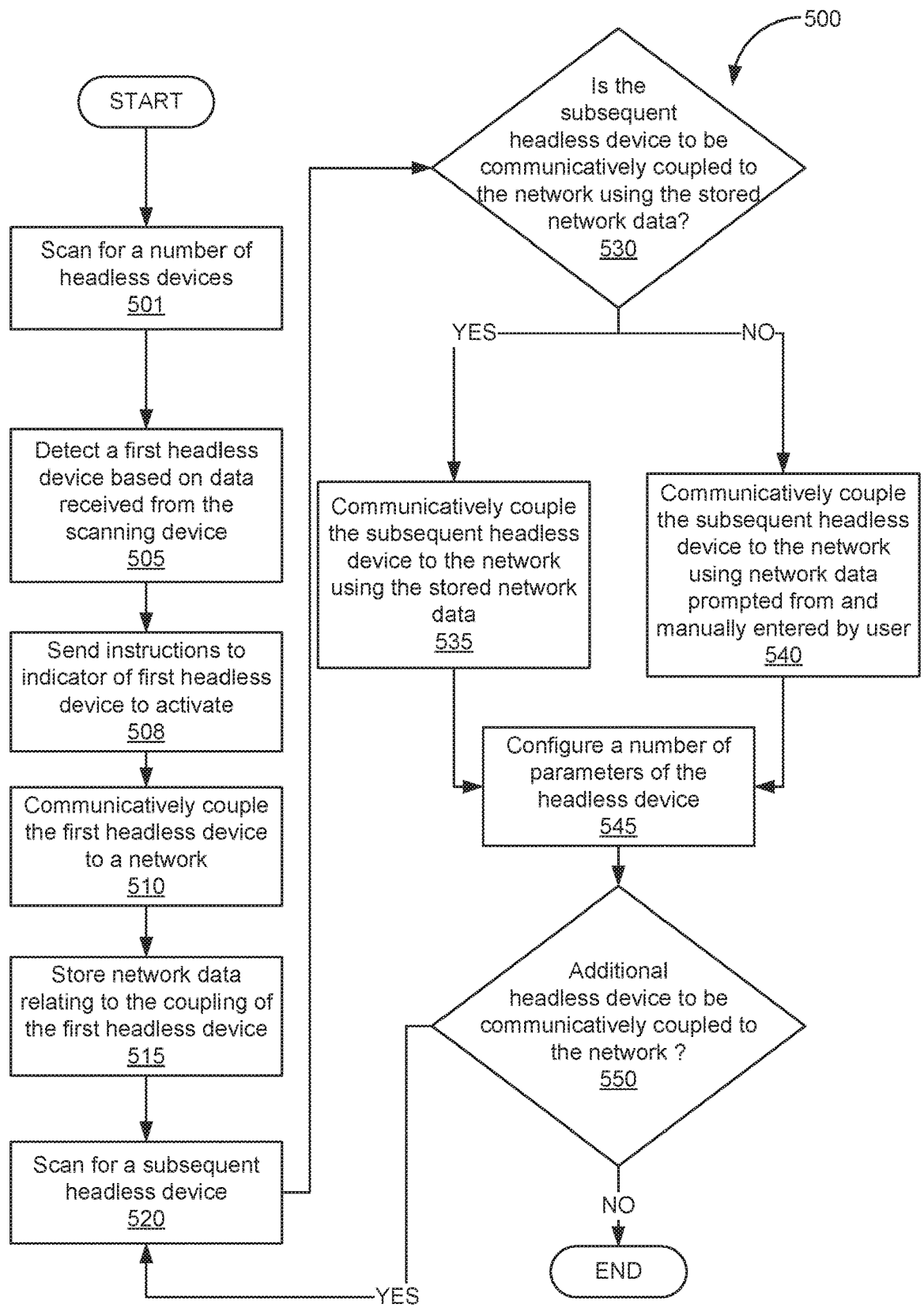

HEADLESS DEVICE INSTALLATIONS

BACKGROUND

Home automation is an area of technology that seeks to create a smart home environment where the control and automation of lighting, heating, ventilation, air conditioning (HVAC), security, and functioning of home appliances such as washer and dryers, ovens, refrigerators, freezers and other home appliances and systems is provided to a user. In many home automation systems, a wireless network such as a Wi-Fi network may be used for remote monitoring and control of these controllable home appliances and systems. In some examples, these controllable home appliances and systems, when remotely monitored and controlled via the Internet, form a constituent of the Internet of Things.

BRIEF DESCRIPTION OF THE DRAWINGS

The accompanying drawings illustrate various examples of the principles described herein and are part of the specification. The illustrated examples are given merely for illustration, and do not limit the scope of the claims.

FIG. 5 is a flowchart showing a method of installing a plurality of headless devices, according to another example of the principles described herein.

Figure 1:
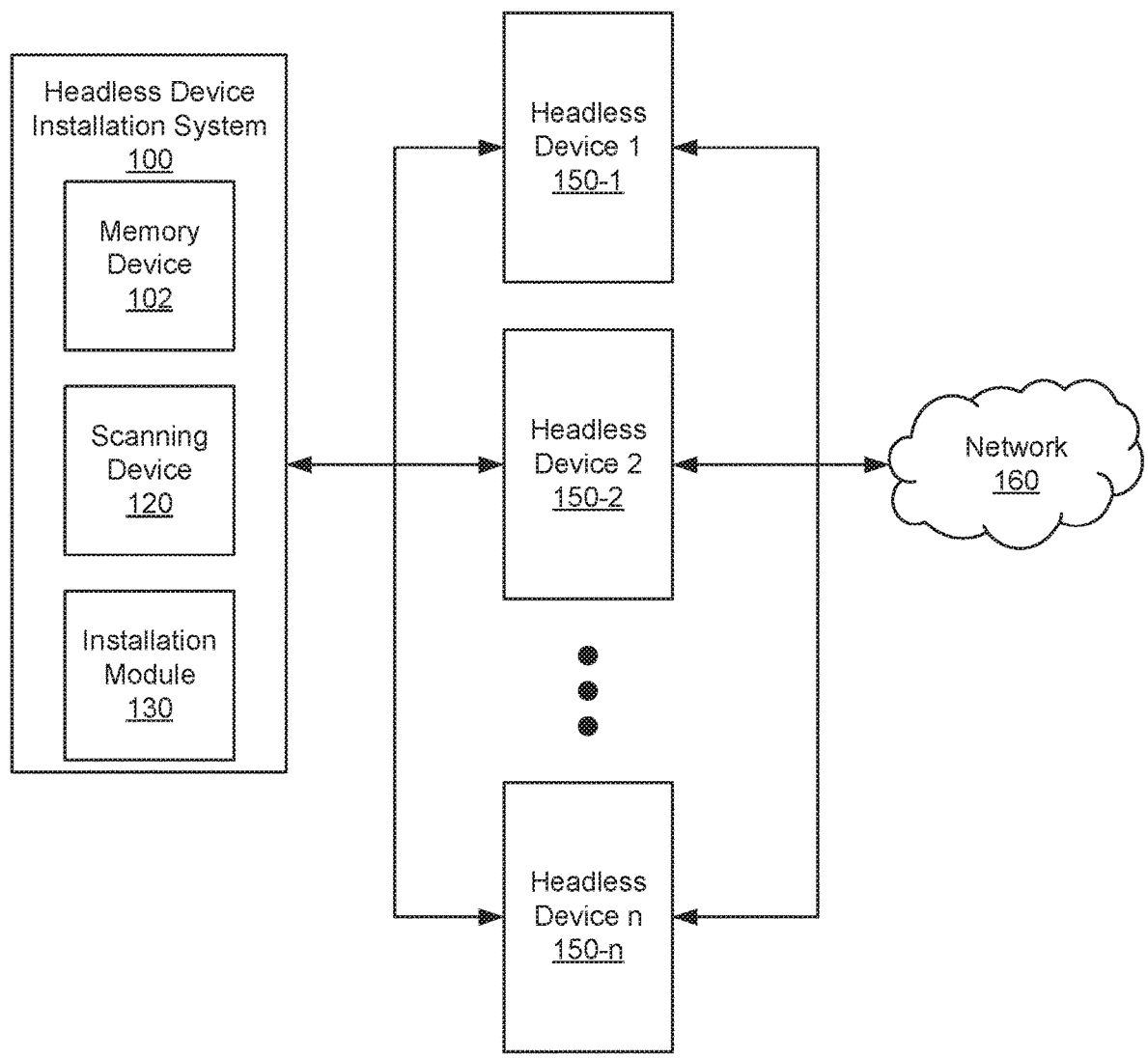
FIG. 1 is a block diagram of a system for installing a plurality of headless devices, according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Home automation systems may include switches and sensors connected to a central hub that may be referred to as a gateway from which the home automation system is controlled through a user interface. In one example, this gateway may be realized in the form of a headless device. As used in the present specification and in the appended claims, the term "headless device" is meant to be understood broadly as any user-interfaceable device that operates without input/output (I/O) devices such as a display device, keyboard, and mouse, but with very few I/O devices included such as, for example, at least one microphone to receive voice commands, and at least one speaker to relay information to a user in the form of audio output. A headless device may also be referred to as a "smart speaker," or an "intelligent personal assistant," and may include, as described herein, at least one speaker and at least one microphone to allow the user to interact with the headless device through speaking into the microphones of the headless device and receiving information from the headless device in the form of audio output from the speakers of the headless device. Examples of headless devices may include, for example, the ECHO™ smart speaker and ECHO DOT™ smart speaker produced and distributed by Amazon.com, Inc., the GOOGLE HOME™ smart speaker produced and distributed by Google, Inc., and the HOMEPOD™ smart speaker produced and distributed by Apple, Inc.

These headless devices may be connected to a wired or wireless network and may have access to the Internet to allow for information obtained from the Internet to be relayed to the user through the speakers. Further, a user may begin an interface session with the headless device by speaking a phrase or word or making a headless device-identifiable noise. The headless devices may be capable of voice interaction, music playback, making to-do lists, setting alarms, streaming podcasts, playing audiobooks, providing weather, traffic and other real-time information, or performing other tasks through commands provided vocally from the user.

In some instances, a user may desire to install and use a plurality of headless devices within a network that covers, for example, a plurality of rooms within the user's home or a plurality of offices within a work environment. However, installation of a plurality of headless devices may be difficult given the iterative nature of setting up or installing each headless device individually. Further, without the ability to use I/O devices in connection with the headless devices, installation of the headless devices may prove labor intensive. Still further, using the microphones and speakers of the headless devices may allow the user to install the headless devices using voice prompts and a user's voice commands. However, the convenience provided by the voice prompts and commands may also prove to be a difficult tool during installation. Further, because many headless devices use voice processing in a cloud network environment, and a "wake word" is processed locally before all other data is process on the cloud network environment, the headless device may not be able to process voice commands from a user if the headless device is not coupled to the network.

Examples described herein provide a system for installing a plurality of headless devices. The system may include a scanning device to scan for a plurality of headless devices and an installation module executable on a processing device. The installation module detects a first headless device of the plurality of headless devices based on data received from the scanning device and communicatively couples the first headless device to a network. The system may also include a memory device to store network data relating to the coupling of the first headless device to the network. The scanning device may scan for at least a second headless device of the plurality of headless devices. Further, the installation module may couple the second headless device to the network based on the stored network data.

The system may also include at least one indicator to indicate which of the headless devices is being installed. The installation module may send instructions to at least one indicator of the headless devices to indicate which of the plurality of headless devices is being installed. The at least one indicator may include an audio indicator, a visual indicator, or combinations thereof. The audio indicator may provide a language-based indication of which of the plurality of headless devices is being installed. The installation module configures at least one parameter of each of the headless devices.

Examples described herein also provide a method of installing a plurality of headless devices. The method may include, with a scanning device, scanning for a plurality of headless devices, detecting a first headless device of the plurality of headless devices based on data received from the scanning device, communicatively coupling the first headless device to a network, storing network data relating to the coupling of the first headless device to the network in a storage device, with the scanning device, scanning for a subsequent headless device of the number of headless devices, and determining if the subsequent headless device is to be communicatively coupled to the network using the stored network data. In response to a determination that the subsequent headless device is to be communicatively coupled to the network using the stored network data, the method may include communicatively coupling the subsequent headless device to the network using the stored network data without user input of the network data.

Scanning for the subsequent headless device, determining if the subsequent headless device is to be communicatively coupled to the network using the stored network data, and in response to the determination that the subsequent headless device is to be communicatively coupled to the network using the stored network data, communicatively coupling the subsequent headless device to the network using the stored network data without user input of the network data may be iterated a number of times until all of the plurality of headless devices are installed. The iteration is performed until all of the plurality of headless devices have been addressed.

The method may include sending instructions to at least one indicator of the headless device of the plurality of headless devices being installed to activate. The method may also include configuring a number of parameters of each of the headless devices.

Examples described herein also provide a computer program product for installing a plurality of headless devices. The computer program product may include a computer readable storage medium including computer usable program code embodied therewith. The computer usable program code, when executed by a processor, instructs a scanning device to scan for a number of headless devices, detects a first headless device of the plurality of headless devices based on data received from the scanning device, communicatively couples the first headless device to a network, stores network data relating to the coupling of the first headless device to the network in a storage device, with the scanning device, scans for a subsequent headless device of the plurality of headless devices, determines if the subsequent headless device is to be communicatively coupled to the network using the stored network data, and in response to a determination that the subsequent headless device is to be communicatively coupled to the network using the stored network data, communicatively couple the subsequent headless device to the network using the stored network data. The computer program product may also include computer usable program code to, when executed by the processor, send instructions to at least one indicator of the headless device of the plurality of headless devices being installed to activate. Scanning for the subsequent headless device, determining if the subsequent headless device is to be communicatively coupled to the network using the stored network data, and in response to the determination that the subsequent headless device is to be communicatively coupled to the network using the stored network data, communicatively coupling the subsequent headless device to the network using the stored network data without user input of the network data is iterated a number of times until all of the plurality of headless devices have been addressed. The computer program product may also include computer usable program code to, when executed by the processor, in response to a determination that the subsequent headless device is not to be communicatively coupled to the network using the stored network data, prompting for manual entry of the network data.

Turning now to the figures, FIG. 1 is a block diagram of a system (100) for installing a plurality of headless devices, according to an example of the principles described herein. The system (100) may include a scanning device (120) to scan for a number of headless devices (150-1, 150-2, 150-n, collectively referred to herein as 150). The scanning device (120) may be any device that can actively and/or passively scan for devices including the headless devices (150) in its scannable area. Active scanning is performed by sending multiple probe requests and recording any probe responses from the headless devices (150). The probe response received may contain data relating to an identifier particular to a headless device (150). In one example of active scanning, if the broadcasting of the headless devices (150) has been turned off, and active scanning is the only type of scanning supported, no headless devices (150) will be detected. However, in this scenario, a headless device (150) may be detected using passive scanning. Passive scanning involves listening to any data sent out by the headless devices (150). Once a connection is made with the headless device, the headless device (150) may send data back to the headless device installation system (100) identifying the headless device (150).

The system (100) may include an installation module (130) installed on a computing device such as the headless device detection system (100). The installation module (130) detects a first headless device (150-1) of the plurality of headless devices (150) based on data received from the scanning device (120), and communicatively couples the first headless device (150-1) to a network (160). The network may be a computing network, a public cloud network, a private cloud network, a hybrid cloud network, other forms of networks, or combinations thereof. In one example, the network (160) may be a wired network including coaxial cables, optical fibers, other data transmission wiring technologies, or combinations thereof. In another example, the network (160) may be a wireless network including, for example, IEEE 802.11 (i.e., Wi-Fi) networks, cellular networks, satellite networks, IEEE 802.15.1 (i.e., Bluetooth) networks, other wireless networks, or combinations thereof. The network (160) may allow the headless device installation system (100), the headless devices (150), or combinations thereof to access large networked resources including the resources provided through access to the Internet.

The system (100) may also include a memory device (102) to store network data relating to the coupling of the first headless device (150) to the network (160). As described herein, the scanning device (120) scans for at least a second headless device (150-2, 150-n) of the plurality of headless devices (150), and the installation module (130) couples the second headless device (150-2, 150-n) to the network (160) based on the network data stored in the memory device (102).

Figure 2:
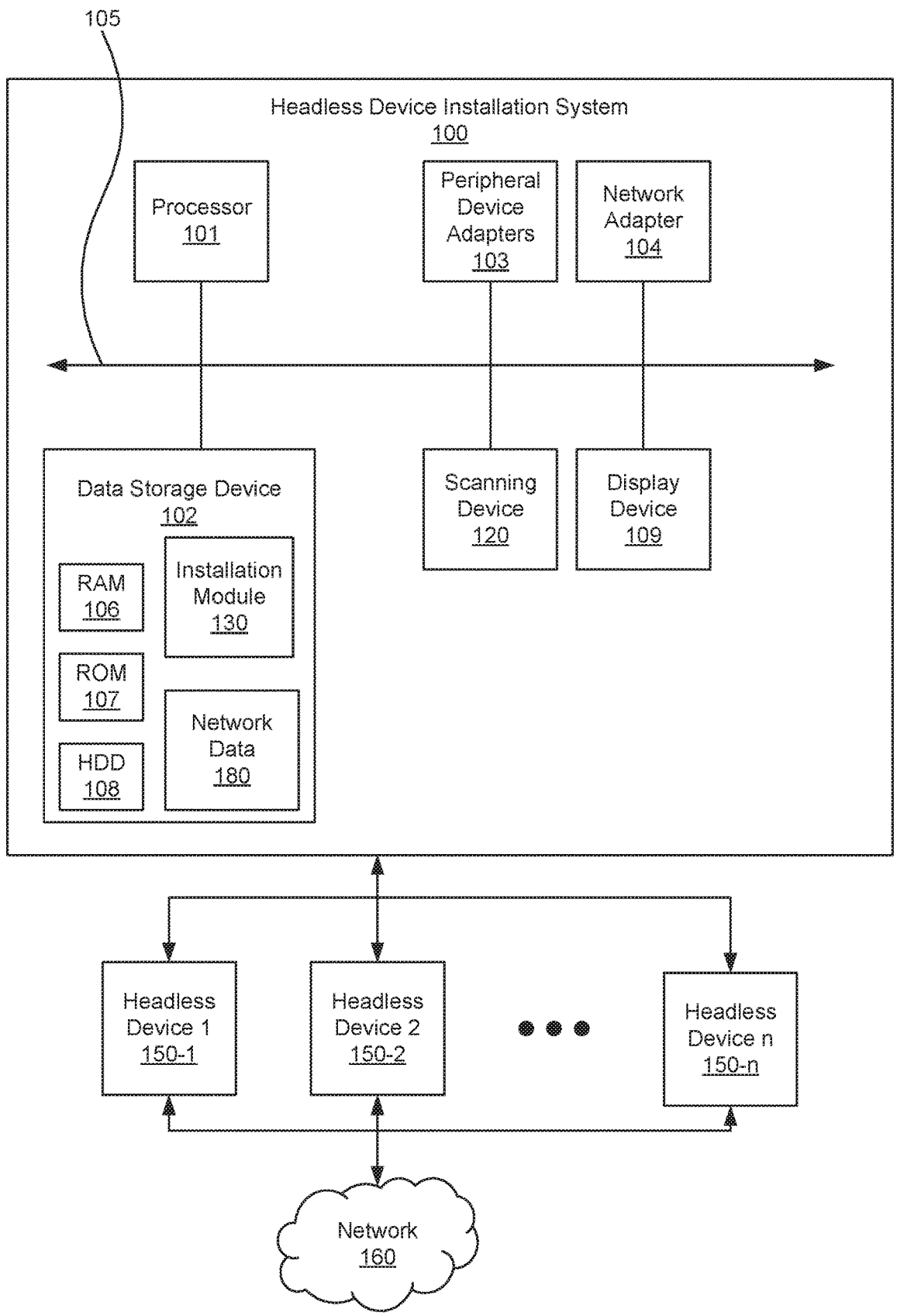
FIG. 2 is a block diagram of a system for installing a plurality of headless devices, according to another example of the principles described herein.

FIG. 2 is a block diagram of a system (100) for installing a plurality of headless devices, according to another example of the principles described herein. The headless device installation system (100) may be implemented in an electronic device. Examples of electronic devices include servers, desktop computers, laptop computers, personal digital assistants (PDAs), mobile devices, smartphones, gaming systems, and tablets, among other electronic devices.

The system (100) may be utilized in any data processing scenario including, stand-alone hardware, mobile applications, through a computing network, or combinations thereof. Further, the system (100) may be used in a computing network, a public cloud network, a private cloud network, a hybrid cloud network, other forms of networks, or combinations thereof. In one example, the methods provided by the system (100) are provided as a service over a network by, for example, a third party. In this example, the service may include, for example, the following: a Software as a Service (SaaS) hosting a number of applications; a Platform as a Service (PaaS) hosting a computing platform including, for example, operating systems, hardware, and storage, among others; an Infrastructure as a Service (IaaS) hosting equipment such as, for example, servers, storage components, network, and components, among others; application program interface (API) as a service (APIaaS), other forms of network services, or combinations thereof. The present systems may be implemented on one or multiple hardware platforms, in which the modules in the system can be executed on one or across multiple platforms. Such modules can run on various forms of cloud technologies and hybrid cloud technologies or offered as a SaaS (Software as a service) that can be implemented on or off the cloud. In another example, the methods provided by the system (100) may be executed by a local administrator.

To achieve its desired functionality, the system (100) includes various hardware components. Among these hardware components may be a number of processors (101), a number of data storage devices (102), a number of peripheral device adapters (103), and a number of network adapters (104). These hardware components may be interconnected through the use of a number of busses and/or network connections. In one example, the processor (101), data storage device (102), peripheral device adapter (103), and network adapter (104) depicted in FIG. 2 may be communicatively coupled via a bus (105). The processor (101) may include the hardware architecture to retrieve executable code from the data storage device (102) and execute the executable code. The executable code may, when executed by the processor (101), cause the processor (101) to implement at least the functionality of scanning an area for headless devices (150), detecting the headless devices (150) based on the scan, communicatively coupling the headless devices (150) to a network (160), storing data in the data storage device (102) defining the coupling of the headless devices (150) to the network (160), activating at least one indicator to indicate which of the number of headless devices (150) are being installed at a given moment, configuring at least one parameter of the headless devices (150), or combinations thereof, according to the methods of the present specification described herein. In the course of executing code, the processor (101) may receive input from and provide output to a number of the remaining hardware units.

The data storage device (102) may store data such as executable program code that is executed by the processor (101) or other processing device. As will be discussed, the data storage device (102) may specifically store computer code representing a number of applications that the processor (101) executes to implement at least the functionality described herein.

The data storage device (102) may include various types of memory modules, including volatile and nonvolatile memory. For example, the data storage device (102) of the present example includes Random Access Memory (RAM) (106), Read Only Memory (ROM) (107), and Hard Disk Drive (HDD) memory (108). Many other types of memory may also be utilized, and the present specification contemplates the use of many varying type(s) of memory in the data storage device (102) as may suit a particular application of the principles described herein. In certain examples, different types of memory in the data storage device (102) may be used for different data storage needs. For example, in certain examples the processor (101) may boot from Read Only Memory (ROM) (107), maintain nonvolatile storage in the Hard Disk Drive (HDD) memory (108), and execute program code stored in Random Access Memory (RAM) (106).

The data storage device (102) may include a non-transitory computer readable medium, a computer readable storage medium, or a non-transitory computer readable medium, among others. For example, the data storage device (102) may be, but not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store, computer usable program code for use by or in connection with an instruction execution system, apparatus, or device. In another example, a computer readable storage medium may be any non-transitory medium that can contain, or store, a program for use by or in connection with an instruction execution system, apparatus, or device.

The hardware adapters (103, 104) in the system (100) enable the processor (101) to interface with various other hardware elements, external and internal to the system (100). For example, the peripheral device adapters (103) may provide an interface to input/output devices, such as, for example, display device (109), a mouse, or a keyboard. The peripheral device adapters (103) may also provide access to other external devices such as an external storage device, a number of network devices such as, for example, servers, switches, and routers, client devices, other types of computing devices, and combinations thereof.

The display device (109) may be provided to allow a user of the system (100) to interact with and implement the functionality of the system (100). The peripheral device adapters (103) may also create an interface between the processor (101) and the display device (109), a printer, or other media output devices. The network adapter (104) may provide an interface to other computing devices within, for example, a network, thereby enabling the transmission of data between the system (100) and other devices located within the network.

The system (100) may, when executed by the processor (101), display the number of graphical user interfaces (GUIs) on the display device (109) associated with the executable program code representing the number of applications stored on the data storage device (102). Examples of display devices (109) include a computer screen, a laptop screen, a mobile device screen, a personal digital assistant (PDA) screen, and a tablet screen, among other display devices (109). Examples of the GUIs displayed on the display device (109) will be described in more detail below.

The system (100) further includes a number of modules used in the implementation of installing a plurality of the headless devices (150). The various modules within the system (100) include executable program code that may be executed separately. In this example, the various modules may be stored as separate computer program products. In another example, the various modules within the system (100) may be combined within a number of computer program products, each computer program product including a number of the modules.

The system (100) may include an installation module (130) to, when executed by the processor (101), perform the methods of installation described herein. In one example, the installation module (130) may be provided to a user as a program package provided to a user's computing device such as the system (100). The installation module (130) may be an app downloaded from an app store to a users smart phone or other computing device. The user's computing device may become the headless device installation system (100). Further, in an example where the user's smartphone is the headless device installation system (100), the user may simply download the installation module (130) as an app from, for example, an app store accessible via the Internet and utilize the various GUIs and functions of the installation module (130) while unboxing the plurality of headless devices (150) he or she desires to couple to the network (160). This creates a familiar and user-friendly installation process of the headless devices (150).

The installation module (130) may cause instructions to be sent to the scanning device (120) to scan for a number of headless devices (150). The installation module (130) may also detect a first headless device (150-1) of the plurality of headless devices (150) that is to be communicatively coupled to the network (160). This detection of the headless devices (150) may be performed based on data received from the scanning device (120).

The installation module (130) may also communicatively couple the first headless device (150-1) to the network (160). This may be performed by providing access credentials of the network (160) to the first headless device (150-1). In this first instance of coupling the first headless device (150-1) to the network (160), the user provides the network data (180) to the first headless device (150-1) by manually entering the network data (180) via the installation module (130). The installation module (130) may store network data (180) relating to the coupling of the first headless device (150-1) to the network (160) in the storage device (102). The network data (180) may be any data or other information that may be used to authenticate the headless devices (150) with respect to the network (160). In one example, the network data (180) may include a Wi-Fi service set identifier (SSID), such as the wireless network name, and a security password for that network such as a Wi-Fi protected access (WPA) or Wi-Fi protected access II (WPA2) passphrase. In one example, during the coupling of the headless devices (150), a list of available wireless networks may be presented on the headless device installation system (100), and the user is allowed to select the network (160) among the list of available networks. In an example, where the network SSID is not broadcast for reasons such as security, the user may be prompted to manually enter the SSID name.

The installation module (130) may also instruct the scanning device (120) to scan for a subsequent headless device (150-2, 150-n) of the number of headless devices (150), and determine if the subsequent headless device (150-2, 150-n) is to be communicatively coupled to the network (160). Communicatively coupling the subsequent headless device (150-2, 150-n) to the network (160) may be performed utilizing the stored network data (180). Thus, in response to a determination that the subsequent headless device (150-2, 150-n) is to be communicatively coupled to the network (160) using the stored network data (180), the installation module (130) may communicatively couple the subsequent headless device (150-2, 150-n) to the network (160) using the stored network data (180).

In one example, the network data (180) may be temporarily cached in the data storage device (102) after the installation of the first headless device (150-1), and then deleted after a confirmation that those headless devices (150) the user desires to install have been installed. In another example, the network data (180) may be permanently stored to allow for any future purchases of additional headless devices (150) to be installed in a user-friendly and expeditious manner.

The installation module (130) may also cause instructions to be sent to a number of indicators (FIG. 3, 240) included within the headless devices (150). These indicators (FIG. 3, 240), during post-installation service, may serve to provide a user with indications as to the various functions of the headless devices (150) including, for example, waking up or activation of the headless devices (150), processing of data by the headless devices (150), and user-interaction with the headless devices, among other functions. However, before and during installation using the installation module (130), the instructions sent to the indicators (240) included within the headless devices (150) may cause a headless device (150) to be identified as the headless device (150) among the number of headless device that is currently being installed. Each headless device (150) may have such instructions sent to activate its indicators (240) in turn when installation for those individual headless devices (150) takes place.

The indicators (FIG. 3, 240) may include audio indicators that create sounds through speakers (FIG. 3, 220) of the headless devices (150), visual indicators such as light emitting diodes (LEDs) that activate when instructed, or combinations of audio and visual indicators. In one example, the audio indicator may include a language-based indicator such as, for example, a voice that states, through the speakers (FIG. 3, 220), that that particular headless device (150) is currently being installed. Any phrase that indicates such a situation may be produced using the voice indicator. In one example, the visual indicators may include a change in the LED, performance of an LED animation, or other visual indicators.

The installation module (130) may also send instructions to the headless devices (150) to configure a number of parameters of the headless devices (150). These parameters may include, for example, volume levels of audio output produced by the speakers (FIG. 3, 220), change default states of the headless devices (150), change colors of the LED indicators of the headless devices (150), or change other parameters of the headless devices (150). For example, one parameter that may be selected by a user may be a language the headless devices (150) use to communicate with the user.

Figure 3:
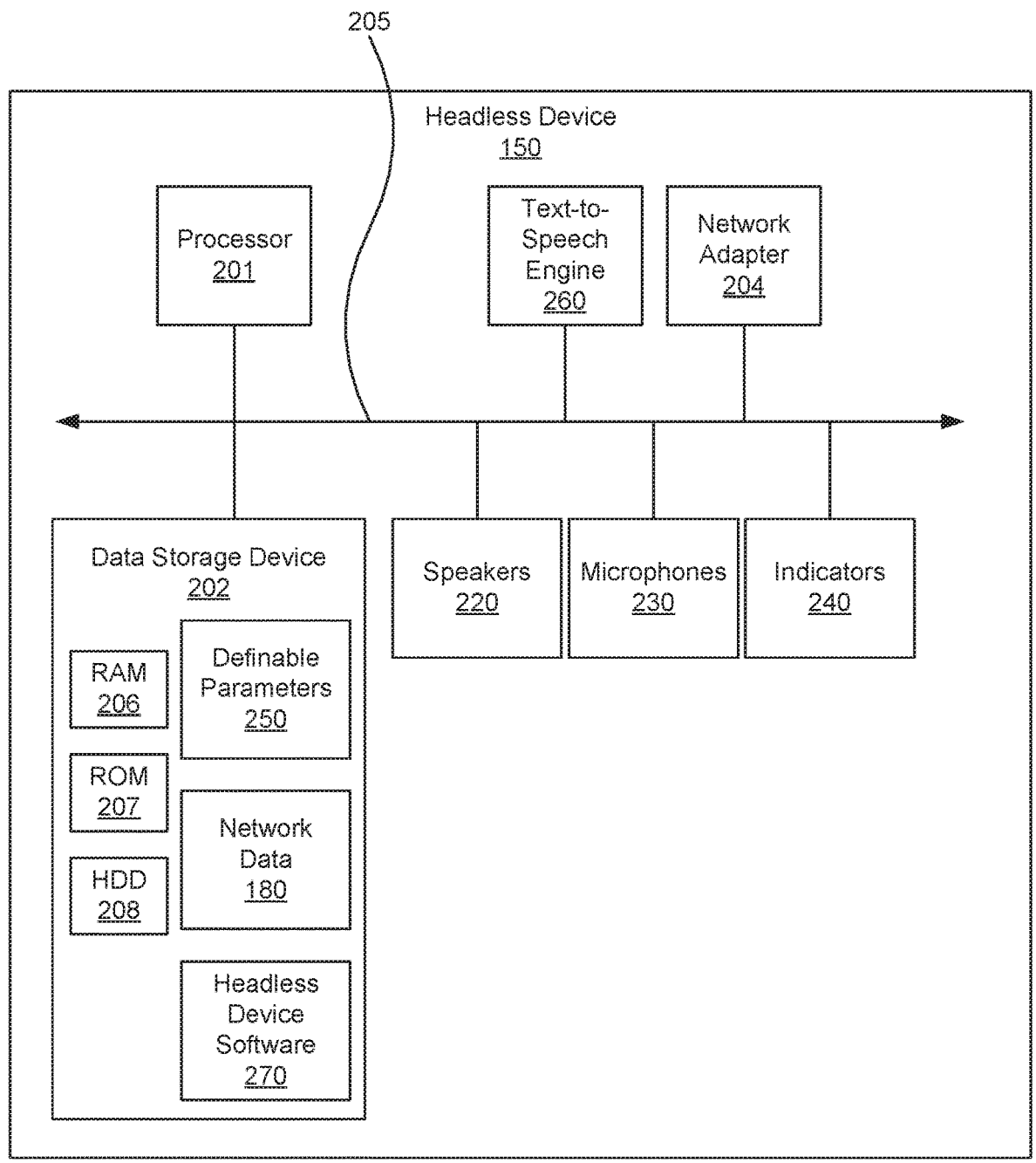
FIG. 3 is a block diagram of a headless device installed among a plurality of headless devices, according to an example of the principles described herein.

FIG. 3 is a block diagram of a headless device (150) installed among a plurality of headless devices (150), according to an example of the principles described herein. The headless device (150) may be utilized in any data processing scenario including stand-alone hardware, mobile applications, through a computing network, or combinations thereof. Further, the headless device (150) may be used in a computing network, a public cloud network, a private cloud network, a hybrid cloud network, other forms of networks, or combinations thereof. In one example, the methods and functions provided by the headless device (150) are provided as a service over a network by, for example, a third party. In this example, the service may include, for example, the following: a Software as a Service (SaaS) hosting a number of applications; a Platform as a Service (PaaS) hosting a computing platform including, for example, operating systems, hardware, and storage, among others; an Infrastructure as a Service (IaaS) hosting equipment such as, for example, servers, storage components, network, and components, among others; application program interface (API) as a service (APIaaS), other forms of network services, or combinations thereof. The present systems may be implemented on one or multiple hardware platforms, in which the modules in the system can be executed on one or across multiple platforms. Such modules can run on various forms of cloud technologies and hybrid cloud technologies or offered as a SaaS (Software as a service) that can be implemented on or off the cloud. In another example, the methods provided by the headless device (150) may be executed by a local administrator.

To achieve its desired functionality, the headless device (150) includes various hardware components, many of which are similar to the headless device installation system (100). Among these hardware components may be a number of processors (201), a number of data storage devices (202), and a number of network adapters (204). These hardware components may be interconnected through the use of a number of busses and/or network connections. In one example, the processor (201), data storage device (202), and network adapter (204) depicted in FIG. 3 may be communicatively coupled via a bus (205). The processor (201) may include the hardware architecture to retrieve executable code from the data storage device (202) and execute the executable code. The executable code may, when executed by the processor (201), cause the processor (201) to implement at least the functionality of receiving instructions from the headless device installation system (100) including instructions to connect to the network (160), configure at least one of the headless device's (150) parameters, activate at least one of the headless device's indicators (240), receive the network data (180) from the headless device installation system (100), connect to the network (160), activate the speakers (220) and the microphones (230) to provide communication between a user and the headless device (150), and access data over the network (160), or combinations thereof, according to the methods of the present specification described herein. In the course of executing code, the processor (201) may receive input from and provide output to a number of the remaining hardware units.

The data storage device (202) of the headless devices (150) includes characteristics and functions similar to the data storage device (102) of the headless device installation system (100), and may include Random Access Memory (RAM) (206), Read Only Memory (ROM) (207), and Hard Disk Drive (HDD) memory (208) that also include characteristics and functionality similar to the RAM) (106), ROM (107), and HDD memory (108) of the headless device installation system (100).

Any number of speakers (220) may be included within each of the headless devices (150). The speakers (220) may be used by the headless devices (150) to provide audio feedback to the user in the form of a voice-enabled intelligent personal assistant where information requested by the user is relayed using a text-to-speak engine (260) that may use natural language processing (NLP) software to achieve high-speed accuracy in the natural life-like voice heard by the user.

The headless devices (150) may also include a number of microphones (230). In one example, the microphones (230) are far-field microphones capable of detecting noises including a user's voice from relatively far distances such as across a room or from other areas within the user's home or work environment, for example. Any number of microphones (230) may be included within the headless devices (150) to allow for an accurate reception of the user's voice commands.

Each of the headless devices (150) may also be initiated or activated using a "wake word," and are capable of voice interaction, music playback, making to-do lists, setting alarms, streaming podcasts, playing audiobooks, and providing weather, traffic and other real-time information based on commands received and understood from the user. The headless devices (150) may also control several smart devices and appliances using itself as a home automation hub. This functionality is achieved using the processor (201) to execute the headless device software (270) stored in the data storage device (202).

As described above, the indicators (240) of each of the headless devices (150) provides visual feedback to the user as to which of the headless devices is currently being installed, and each headless device (150) may activate their respective indicators (240) in turn. Further, the indicators may be used after installation and during post-installation as visual feedback to the user to indicate various functions of the headless device (150).

The definable parameters (250) of the headless devices (150) include any adjustable parameter associated with the various functions of the headless devices (150). As described herein, these parameters may be adjusted at the time each of the headless devices (150) are being installed.

The headless devices also include network data (180). The network data (180) may be conveyed from the headless device installation system (100) to each of the headless devices (150) as each of the headless devices (150) are being installed and may be stored in the data storage devices (202) of each of the headless devices (150). In this manner, the headless devices (150) may be able to connect or reconnect to the network (160) if a connection is lost due to power loss, a reset of the headless devices (150), or other connectivity issues.

Figure 4:
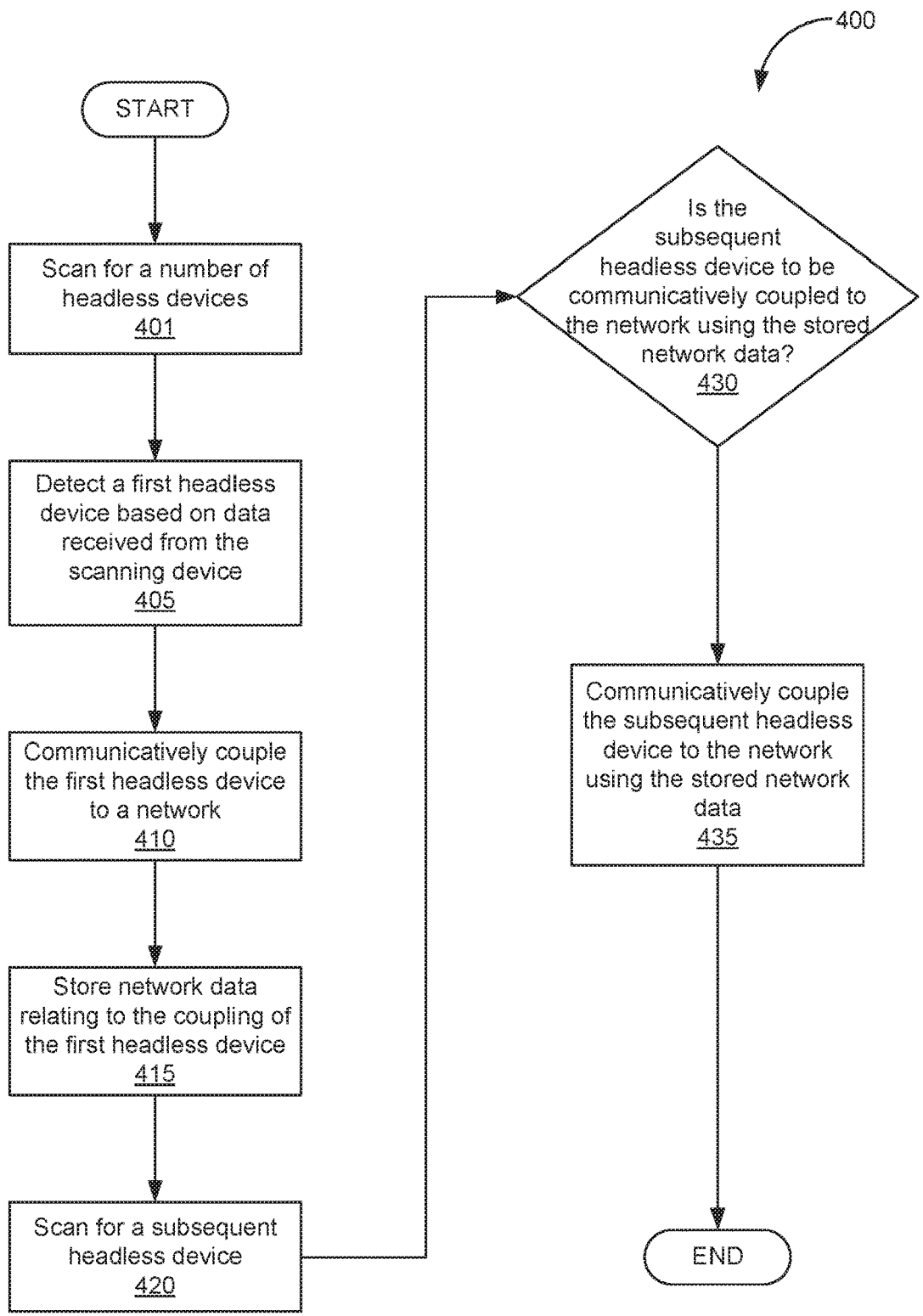
FIG. 4 is a flowchart showing a method of installing a plurality of headless devices, according to an example of the principles described herein.

FIG. 4 is a flowchart showing a method (400) of installing a plurality of headless devices (150), according to an example of the principles described herein. The method (400) may include, with the scanning device (120), scanning (block 401) for a number of headless devices (150). Based on data received from the scanning device (120), the processor (101) of the headless device installation system (100) detects (block 405) a first headless device (150-1) of the plurality of headless devices (150), and communicatively couples (block 410) the first headless device (150-1) to the network (160). In one example, the network data (180) used to couple the first headless device (150-1) to the network (160) may be provided by the user and may be entered by the user via the headless device installation system (100).

The network data (180) relating to the coupling of the first headless device (150-1) to the network (160) is stored (block 415) in the data storage device (102) for use in connecting subsequent headless devices (150). Thus, the scanning device (120) is used to scan (block 420) for a subsequent headless device (150-2, 150-$n$) of the number of headless devices (150), and it is determined (block 430) if the subsequent headless device (150-2, 150-$n$) is to be communicatively coupled to the network (160) using the stored network data (180).

In response to a determination that the subsequent headless device (150-2, 150-n) is to be communicatively coupled to the network (160) using the stored network data (180) (block 430, determination YES), the processor (101) of the headless device installation system (100) communicatively couples (block 435) the subsequent headless device (150-2, 150-n) to the network (160) using the stored network data (180). In one example, communicatively coupling (block 435) the subsequent headless device (150-2, 150-n) to the network (160) using the stored network data (180) may include communicatively coupling the subsequent headless device (150-2, 150-n) to the network (160) using the stored network data (180) without user input of the network data (180). In this example, because the network data (180) is stored in the data storage device (102), the system (100) may cause the subsequent headless device (150-2, 150-n) to couple to the network (160) automatically and without prompting the user for the network data (180). This significantly reduces user-interaction when installing a subsequent headless device (150-2, 150-n) and makes the overall installation of a plurality of headless devices (150) quicker and more user-friendly. Additional aspects of this method will now be described in connection with FIG. 5.

FIG. 5 is a flowchart (500) showing a method (500) of installing a plurality of headless devices (150), according to another example of the principles described herein. Blocks 501, 505, 510, 515, 520, 525, 530, and 535 of FIG. 5 are identical to blocks 401, 405, 410, 415, 420, 425, 430, and 435 of FIG. 4, and their description is provided in connection with FIG. 4. At block 530, in response to a determination that the subsequent headless device (150-2, 150-n) is not to be communicatively coupled to the network (160) using the stored network data (180) (block 530, determination NO), the subsequent headless device (150-2, 150-n) may be communicatively coupled (block 540) to the network (160) using network data (180) prompted from and manually entered by the user.

The method (500) may also include configuring (block 545) a number of parameters of each of the headless devices (150). The configuration of the parameters may be performed as the individual headless device (150) is being installed. In another example, these parameters may be configured when all the headless devices are installed. In this example, the user may choose to adjust parameters of the headless devices (150) on an individual basis or may request that those parameters configured for one headless device (150) be applied to all the headless devices (150) installed on the network (160). In an example, the parameters of the headless devices (150) may be temporarily cached in the data storage device (102) after the installation of the first headless device (150-1), and then deleted after a confirmation that the headless devices (150) the user desires to install have been installed, or may be permanently stored to allow for any future purchases of additional headless devices (150) to be configured using those parameters in a user-friendly and expeditious manner.

The method (500) of FIG. 5 may continue with iterating the method (500) a number of times until all of the plurality of headless devices (150) are installed. Specifically, a determination (block 550) is made as to whether additional headless devices (150) are to be communicatively coupled to the network (160). If no additional headless devices (150) are to be communicatively coupled to the network (160) (block 550, determination NO) due to, for example, a user desire to communicatively couple additional headless devices (150) to a different network or due to installation of all the headless devices (150), then the method (500) terminates. If, however, additional headless devices (150) are to be communicatively coupled to the network (160) (block 550, determination YES), then the method may loop back to block 520 to scan for a subsequent headless device (150-2, 150-n).

Throughout the blocks of FIGS. 4 and 5, instructions may be sent (block 508) from the headless device installation system (100) to at least one indicator (240) of the headless device (150) of the plurality of headless devices (150) being installed to activate the indicator (240). Further, these instructions of block 508 may be sent before each subsequent headless device is communicatively coupled (block 535) in order to allow the user to identify which of the plurality of headless devices (150) is currently being installed.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general-purpose computer, special purpose computer, or other programmable data processing apparatus to produce a machine, such that the computer usable program code, when executed via, for example, the processor (101) of the headless device detection system (100) or other programmable data processing apparatus, implement the functions or acts specified in the flowchart and/or block diagram block or blocks. In one example, the computer usable program code may be embodied within a computer readable storage medium, the computer readable storage medium being part of the computer program product. In one example, the computer readable storage medium is a non-transitory computer readable medium.

The specification and figures describe a system for installing a plurality of headless devices. The system may include a scanning device to scan for a number of headless devices and an installation module installed on a computing device. The installation module detects a first headless device of the plurality of headless devices based on data received from the scanning device, and communicatively couples the first headless device to a network. The system may also include a memory device to store network data relating to the coupling of the first headless device to the network. The scanning device scans for at least a second headless device of the plurality of headless devices. Further, the installation module couples the second headless device to the network based on the stored network data.

Users may easily set up multiple headless devices while entering the network connection data once. In the case where the user purchases a multi-pack of headless devices, this may make the out of box experience much more effective and efficient for the user, which in turn improves customer satisfaction and reduces corporate supports costs.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method of installing a plurality of headless devices, comprising:

scanning for the plurality of headless devices that are to be initially installed and are not yet connected to any network;

detecting a first headless device of the plurality of headless devices;

communicatively coupling the first headless device to a network;

storing network data relating to the coupling of the first headless device to the network in a storage device;

scanning for a subsequent headless device of the plurality of headless devices;

determining if the subsequent headless device is to be communicatively coupled to the network using the stored network data;

in response to a determination that the subsequent headless device is to be communicatively coupled to the network using the stored network data, communicatively coupling the subsequent headless device to the network using the stored network data without user input of the network data; and deleting the network data relating to the coupling of the first headless device to the network from the storage device when a last headless device has been connected to the network.

2. The method of claim 1, wherein scanning for the subsequent headless device, determining if the subsequent headless device is to be communicatively coupled to the network using the stored network data, and in response to the determination that the subsequent headless device is to be communicatively coupled to the network using the stored network data, communicatively coupling the subsequent headless device to the network using the stored network data without user input of the network data is iterated a number of times until all of the plurality of headless devices are installed.

3. The method of claim 2, wherein the iteration is performed until all of the plurality of headless devices have been addressed.

4. The method of claim 1, comprising sending instructions to at least one of the headless device of the plurality of headless devices being installed to activate.

5. The method of claim 1, comprising configuring a parameter of each of the headless devices.

6. The method of claim 1, wherein storing network data relating to the coupling of the first headless device to the network in a storage device further comprises storing a network identifier for the network and a security password for the network that were used to connect the first headless device to the network.

* * * * *